Aug. 11, 1964 J. P. GLASS 3,144,523
CAM OPERATED SAMPLING SWITCH HAVING MEANS FOR CHANGING
THE SWITCH-CLOSING TIME BY SMALL INCREMENTS
Filed July 20, 1961 6 Sheets-Sheet 4
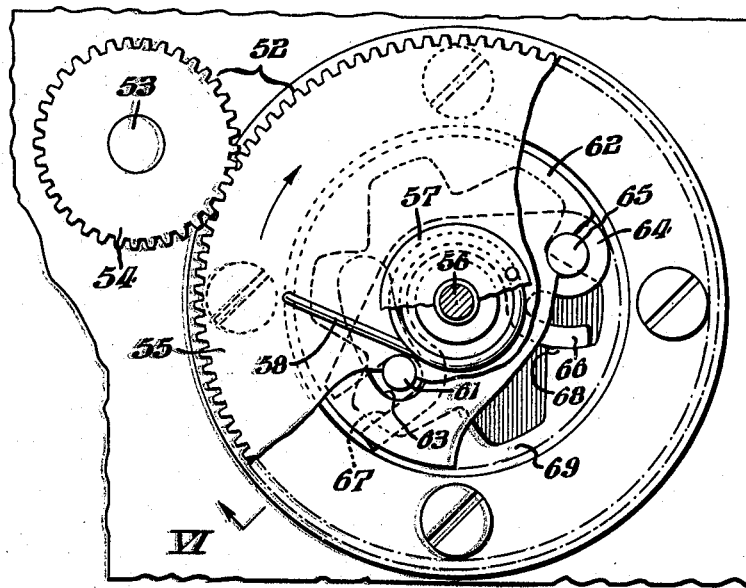
FIG-5
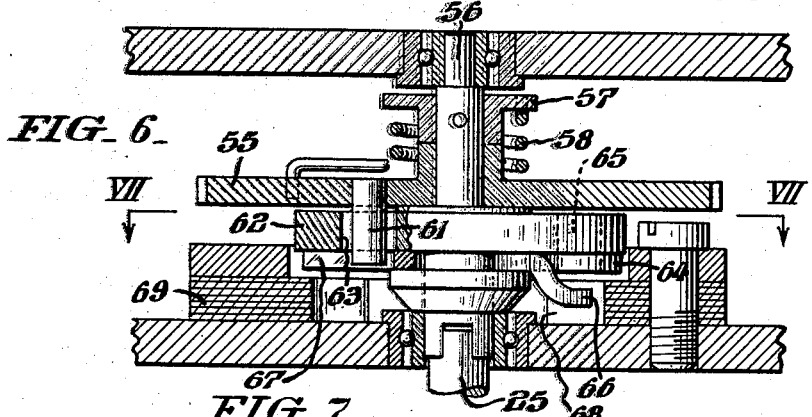
FIG-6
FIG-7
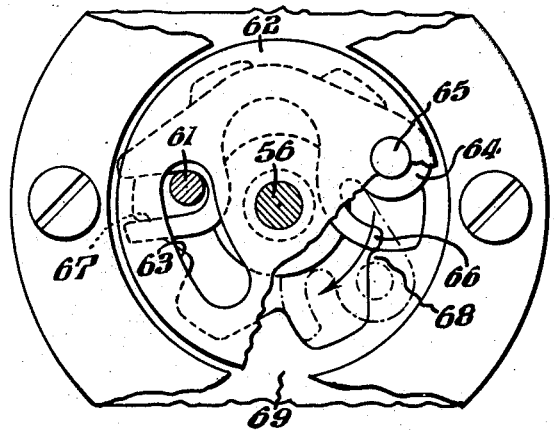
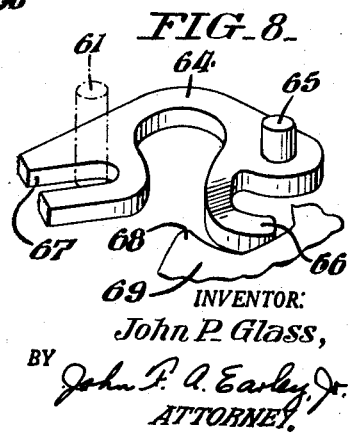
FIG-8
INVENTOR:
John P. Glass,
BY John F. A. Earley, Jr.
ATTORNEY.

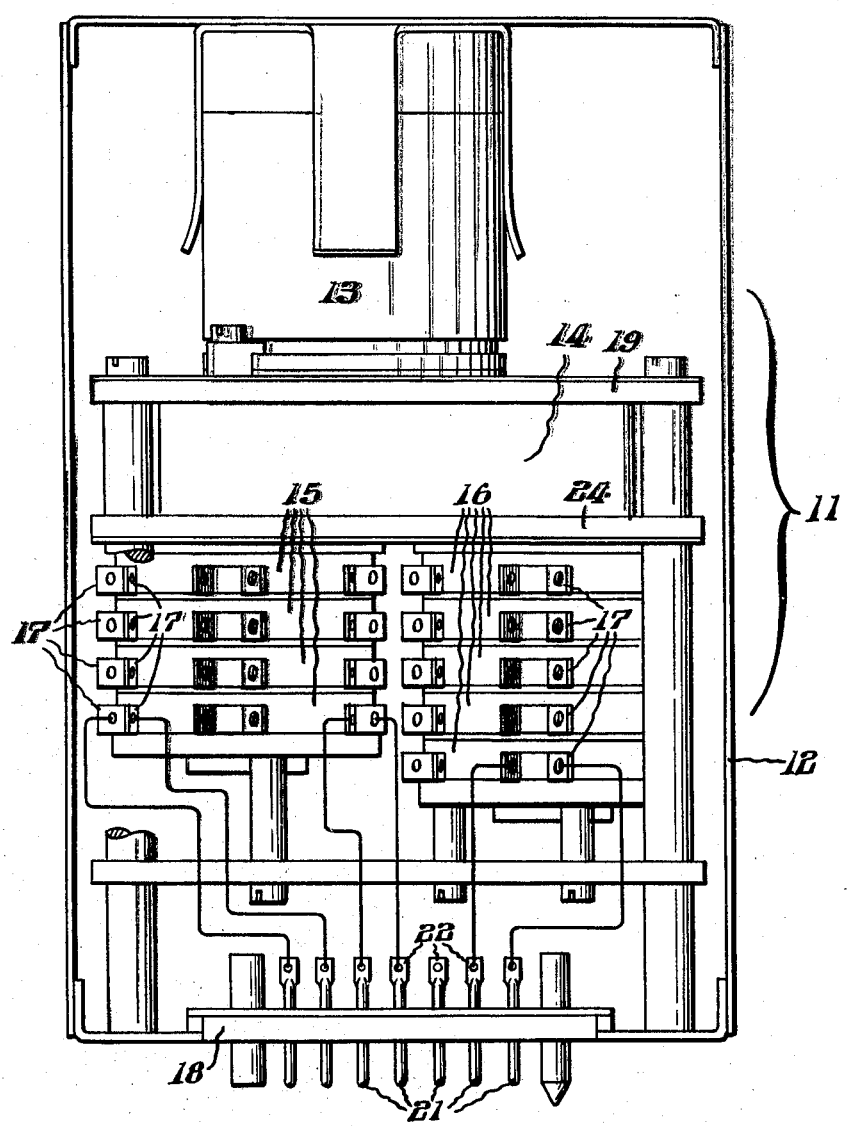

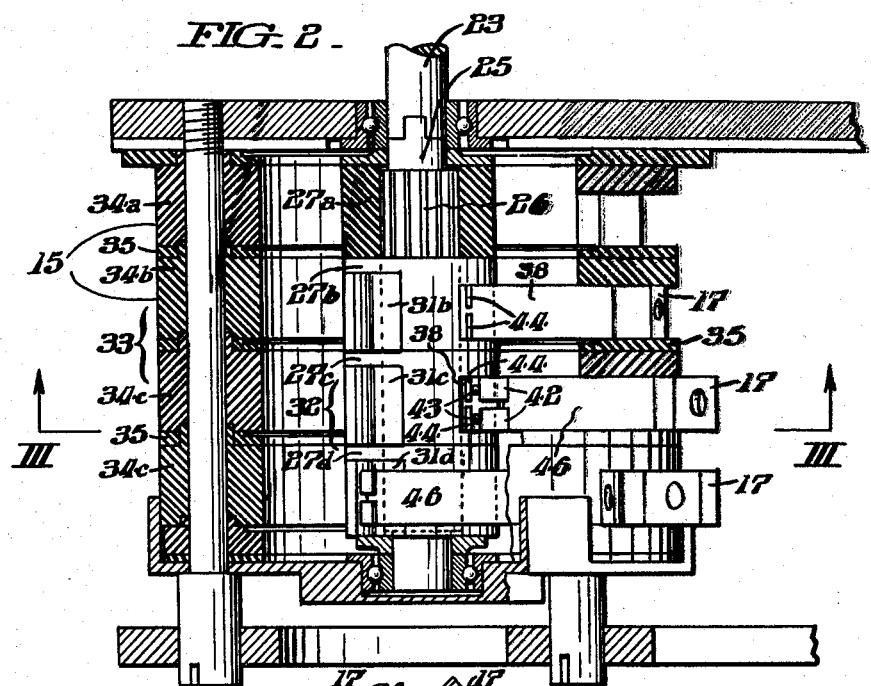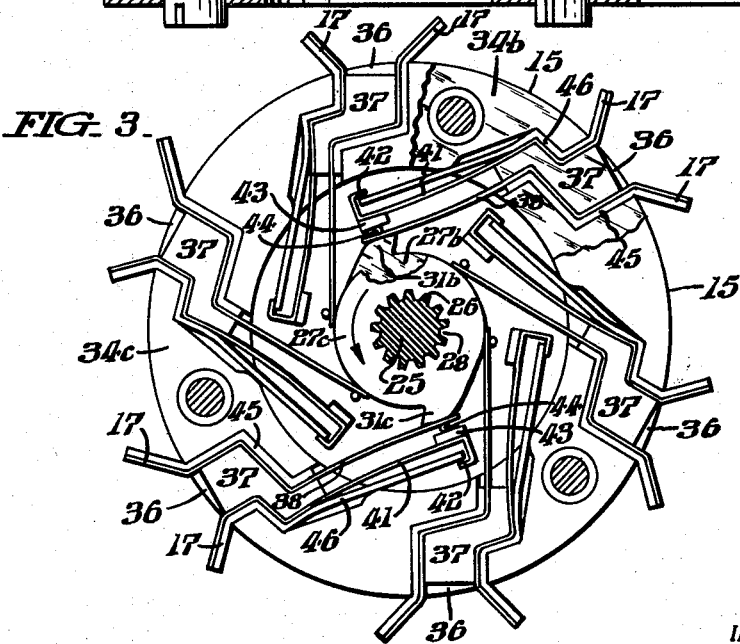

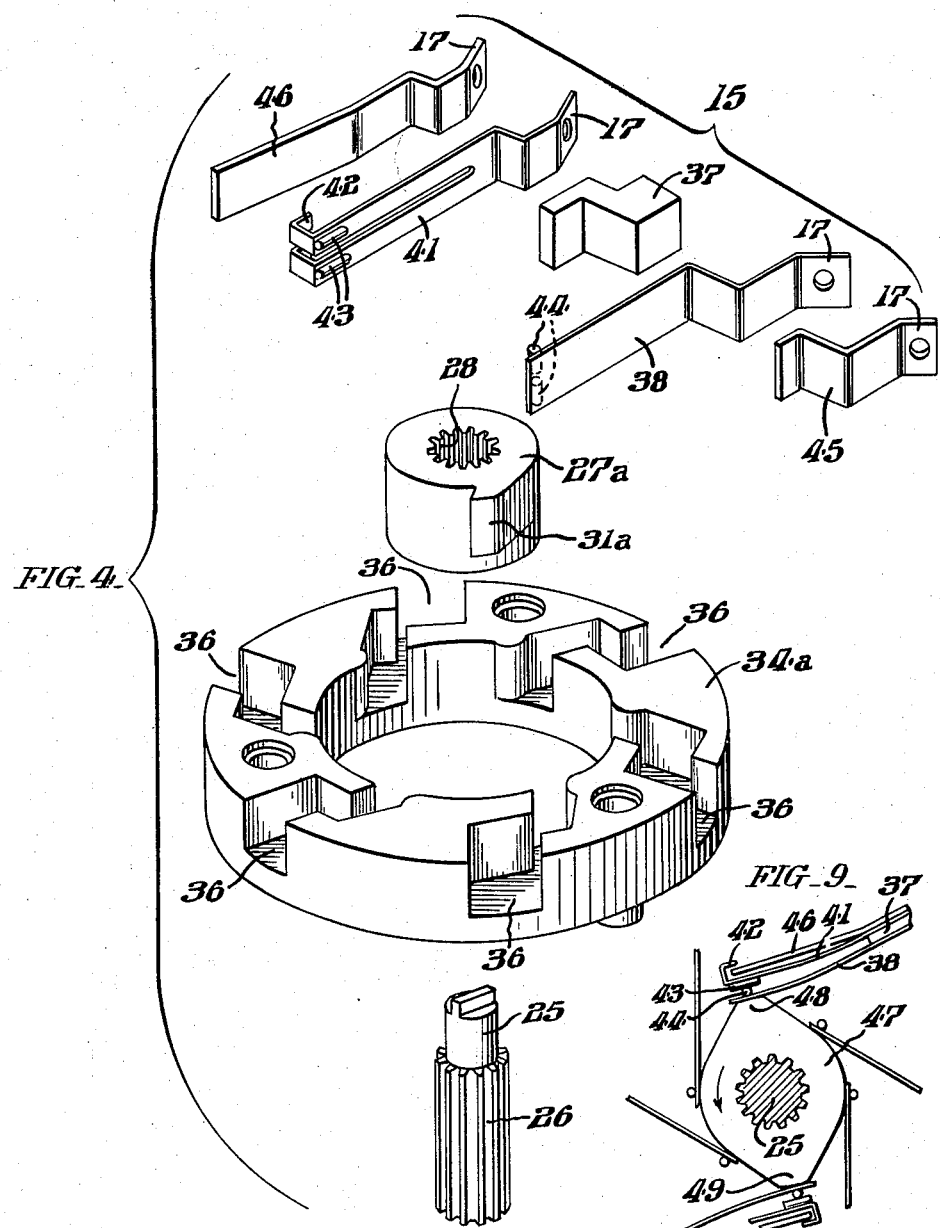

Aug. 11, 1964   J. P. GLASS   3,144,523
CAM OPERATED SAMPLING SWITCH HAVING MEANS FOR CHANGING
THE SWITCH-CLOSING TIME BY SMALL INCREMENTS
Filed July 20, 1961   6 Sheets-Sheet 5

INVENTOR:
John P. Glass,
BY
John F. A. Earley, Jr.
ATTORNEY.

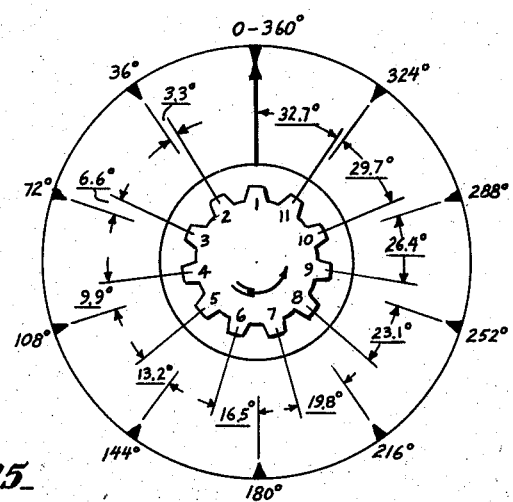
FIG_15_
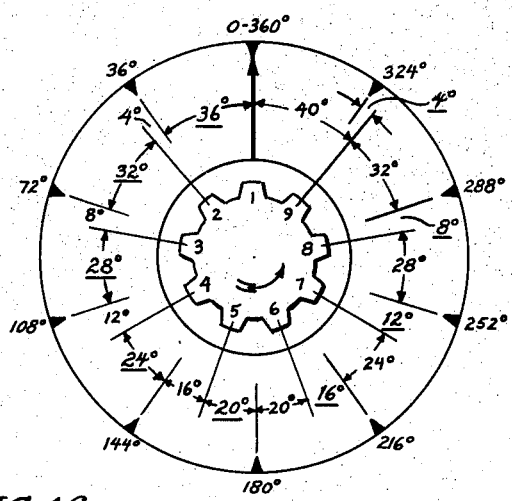
FIG_16_

United States Patent Office 3,144,523
Patented Aug. 11, 1964

3,144,523
CAM OPERATED SAMPLING SWITCH HAVING
MEANS FOR CHANGING THE SWITCH-CLOSING
TIME BY SMALL INCREMENTS
John P. Glass, 718 Lorraine Ave., Ardmore, Pa.
Filed July 20, 1961, Ser. No. 125,575
11 Claims. (Cl. 200—38)

This invention relates to improvements in electrical switches, and more particularly concerns improvements in sampling switch apparatus, with the switch contact apparatus thereof, and with a method of changing the relative time of closing the switches by small increments of time.

This application is a continuation-in-part of my U.S. patent application No. 758,503, filed September 2, 1958, now U.S. Patent No. 3,035,129.

It is an object of this invention to provide sampling switch apparatus having switch contacts, the making and breaking of which are accurately timed and controlled.

It is another object of this invention to provide vernier means for changing the time of closing of a switch by small increments of time with respect to the time of closing of another switch.

It is another object to provide a method of changing the time of closing of one swtich by desired increments of time with respect to the time of closing of another switch.

It is another object of this invention to provide sampling switch apparatus having switch contacts which are fixedly secured against all unwanted movement including sliding and twisting movements.

It is another object of this invention to provide sampling switch apparatus having switch contacts fixedly secured to a support without the use of screws.

It is another object of this invention to provide sampling switch apparatus having switch contacts connected to electrical circuits wherein the exact sequence of opening and losing those circuits is accurately controlled.

It is another object of this invention to provide sampling switch apparatus having switch contacts connected to electrical circuits and wherein the exact sequence of opening and losing the circuits is easily adjustable.

It is another object of this invention to provide sampling switch apparatus which is quickly and easily replaceable as a package unit.

Other objects and advantages of this invention will further become apparent hereinafter and in the drawings, in which:

FIG. 1 is a view in side elevation and partly broken away of sampling switch apparatus constructed in accordance with this invention;

FIG. 2 is an enlarged view in section of a sampling switch constructed in accordance with this inventon;

FIG. 3 is a view in section and partly broken away taken as indicated by the lines and arrows III—III which appear in FIG. 2;

FIG. 4 is an exploded view of the parts of the sampling switch;

FIG. 5 is a view in top plan and partly broken away of one embodiment of drive mechanism constructed in accordance with this invention;

FIG. 6 is a sectional view in elevation taken as indicated by the lines and arrows VI—VI which appear in FIG. 5;

FIG. 7 is a view taken as indicated by the lines and arrows VII—VII which appear in FIG. 6;

FIG. 8 is a view in perspective of the trigger element of the drive mechanism;

FIG. 9 is a partial view showing a modification of the cam element of the sampling switch;

FIGS. 12–16 are diagrammatic views of alternative embodiments of the invention.

Figure 10:
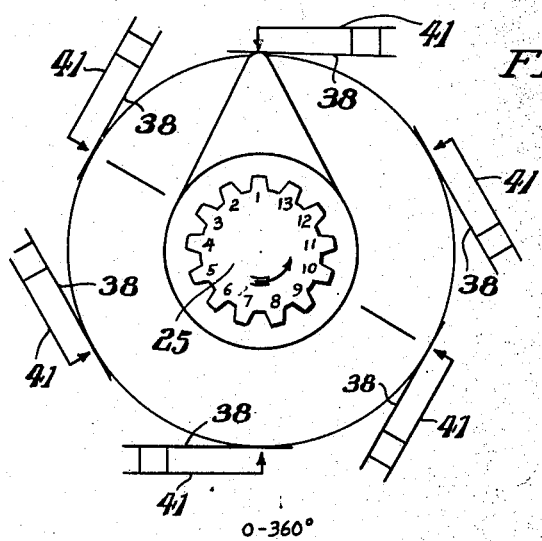
FIG. 10 is a diagrammatic view of FIG. 3.

Although specific terms are used for clarity in the following description, these terms are intended to refer only to the structure shown in the drawings and are not intended to define or limit the scope of the invention.

Turning now to the specific embodiments of the invention selected for illustration in the drawings, the number 11 designates generally a sampling switch apparatus including a casing 12 having mounted therein a timing motor 13, drive mechanism 14 with top plate 19 and bottom plate 24, sampling switches 15 and 16 having terminals 17, and terminal block 18 having casing terminals 22 (including prongs 21) which are connected by electrical wiring to terminals 17.

Referring to FIGS. 2–4, sampling switch 15 is driven by drive shaft 23 which extends through bottom plate 24 of drive mechanism 14 and is keyed to a splined shaft 25 having an odd number of teeth 26. Mounted on shaft 25 are a number of rotatable cams 27a, b, c, and d. Cams 27 are provided with the same number of teeth 28 as splined shaft 25, and are provided with cam lobes 31a, b, c, and d. Splined shaft 25 may be of any desired length and any desired number of cams 27 may be placed on splined shaft 25 to form a cam stack 32.

Positioned around cam stack 32 and concentric therewith is a stack 33 of support rings 34a–d. Rings 34 are separated from each other by insulating washers 35.

Each ring 34 has formed therein a number of Z-shaped recesses 36 which are provided with Z-shaped inserts 37. Fixedly secured within each ring 34 is a flight of radially spaced cam followers 38 which are of flat-leaf, spring construction and which are accurately machined as to dimensions. Also fixedly supported within recesses 36 are elongated contacts 41 which are provided with stop flanges 42 and contact pads 43. Contact pads 43 are adapted to make contact with contact pads 44 of cam follower 38. Also provided are bracket 45 and contact terminal bar 46.

In operation, timing motor 13 rotates to operate the drive mechanism 14 which rotates splined shaft 25 of the sampling switches 15 and 16. Rotation of splined shaft 25 causes the rotation of cams 27, and the cam lobes 31 actuate cam followers 38 so that contact pads 44 make contact with contacts 41 in a precisely controlled timing relation with each other. This timing relationship is shown in FIG. 3 which shows cam lobe 31c of cam 27c making contact with a cam follower 38 which is positioned 180° away from a cam follower 38 mounted in ring 34b which is being contacted by lobe 31b of cam 27b.

The provision of an odd number of teeth on splined shaft 25 and on cams 27 permits accurate adjustment of the lobe position of the cams 27 relative to each other. For example, with 13 teeth provided as shown in FIGS. 2–4, 10 and 11 of the drawings, each tooth is separated from an adjacent tooth by an angle of approximately 2.3 degrees. Adjustment in the timing between cams 27 is accordingly very easily effected by removing, for example cam 27d and rotating it one tooth and dropping it into the next slot of splined shaft 25. By removing cams 27 and replacing them in the appropriate slots, the time of closing the flight of cam followers 38 on ring 34a, for example, is adjusted with respect to the time of closing the flight of cam followers 38 on ring 34b. This provision of an odd number of teeth on splined shaft 25 and cams 27 provides for adjusting the radial position of lobe 31 of one cam 27 with respect to lobe 31 of another cam 27.

FIG. 9 shows another embodiment of a cam 47 which is provided with two lobes 48, 49.

Referring now to FIGS. 5–8, there is shown an alternate embodiment of the drive mechanism 52 which is located between the timing motor 13 and the sampling switch 15. Drive mechanism 52 rotates shaft 25 intermittently and is a delayed action drive, a snap action drive instead of a continuous one.

Timing motor 13 is connected either directly or through intermediate gearing to shaft 53 and gear 54. Gear 54 drives a gear 55 which is mounted free on a drive shaft 56 which is connected to and drives the splined shaft 25.

Drive shaft 56 has a collar 57 pinned thereto. Drive shaft 56 and gear 55 are operatively connected together through a spring 58 which has one end anchored in collar 57 and the other end anchored in gear 55.

Gear 55 has a stud 61 depending therefrom which acts to release the trigger mechanism hereinafter described.

Mounted on shaft 56 below gear 55 is a disc 62 having a slot 63 formed therein in which travels the stud 61.

Below disc 62 is positioned a trigger spring 64 having a pin 65 which is rotatably mounted in disc 62. Trigger spring 64 is also provided with a cam follower 66 and with a trigger release slot 67 which receives stud 61 and thus rotates trigger spring 64 so that cam follower 66 clears projections 68 of stationary cam 69.

FIG. 5 shows drive mechanism 52 in its uncocked position with drive shaft 56 prevented from rotation through the action of trigger spring 64 which is held by cam 69. This holds stationary the pin 65 of trigger spring 64 which in turn prevents from rotation the disc 62. As gear 55 rotates, it causes stud 61 to assume the position shown in FIG. 7, and causes trigger spring 64 to rotate so that cam follower 66 clears protuberance 68 of cam 69. Cam follower 66 being clear of cam 69, disc 62 is rapidly rotated a number of degrees through the action of spring 58.

The cocked position of trigger 54 is shown in FIG. 7 in solid lines, while the next uncocked position of trigger spring 64 is shown in FIG. 7 in dot-dash lines.

In operation, timing motor 13 rotates drive mechanism 52 by rotating shaft 53 and gear 54, which in turn rotates gear 55. Rotation of gear 55 winds up spring 58 and at the same time, through the rotation of stud 61, releases trigger spring 64. After trigger spring 64 is released, the spring 58 releases to rotate disc 62 a number of degrees of rotation and thereby rotate splined shaft 25.

Referring now more particularly to FIGS. 10–16, the vernier means for changing the time of closing of one switch by small increments of time with respect to the time of closing of another switch will now be described more fully. Also, the method of changing the time of closing of one switch with respect to the time of closing of another switch will be explained with more particularity.

Figure 11:
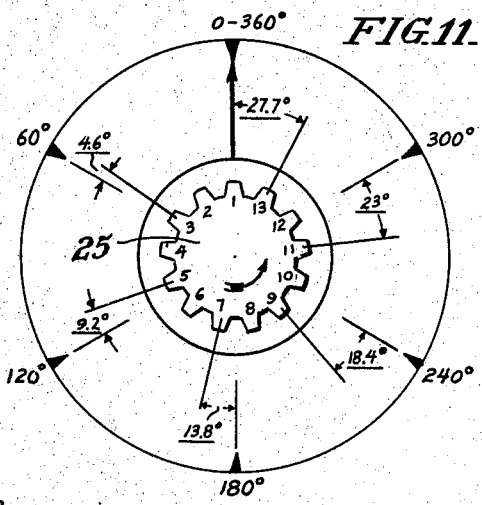
FIG. 11 is a diagrammatic view of FIG. 10.

FIGS. 10 and 11 are diagrammatic views of FIG. 3 and disclose switch apparatus which includes six switches on each flight spaced sixty degrees apart along the support rings, the splined shaft 25 being provided with thirteen teeth numbered 1–13. The feathered arrows in FIGS. 10–16 indicate the direction of rotation of shaft 25.

With such an arrangement as is shown in FIGS. 3, 10, and 11, the relative time of closing the switches of one flight may be varied by increments of time corresponding to approximately 4.6 degrees of cam rotation relative to the time of closing a switch of another flight. This is accomplished by advancing the cam of the other flight by two teeth (55.4 degrees, since each tooth is approximately 27.7 degrees apart). This advancing of the cam by two teeth of the splined shaft is followed by advancing the electrical leads of the switch 60 degrees and connecting them to the next switch, or by advancing the support ring itself by the distance between switches, if construction is adaptable for this.

As another example, by advancing the cam by four teeth and its switch by two switch positions to 120 degrees, the increment of time between switch closings corresponds to 9.2 degrees of cam rotation.

Similarly, by advancing the cam by six teeth, and advancing its switch by three positions to 180 degrees, the increment of time between switch closings corresponds to 13.8 degrees of cam rotation.

In like manner, advancing the cam by eight teeth and its switch by three positions to 240 degrees gives a time increment between switch closings corresponding to 18.4 degrees of cam rotation; advancing the cam by ten teeth and the switch by five positions to 300 degrees, gives an increment of 23 degrees of cam rotation; and advancing the cam by twelve teeth and the switch by six positions to 360 degrees (or zero degrees) gives an increment of time corresponding to 27.7 degrees of cam rotation (which gives a time differential corresponding to a full tooth of cam rotation).

It will be noted that the vernier increment is 4.6 degrees in the example of FIGS. 3, 10, and 11, since 9.2 degrees, 13.8 degrees, 18.4 degrees, 23 degrees, and 27.7 degrees are all multiples of 4.6 degrees (approximately).

Figure 12:
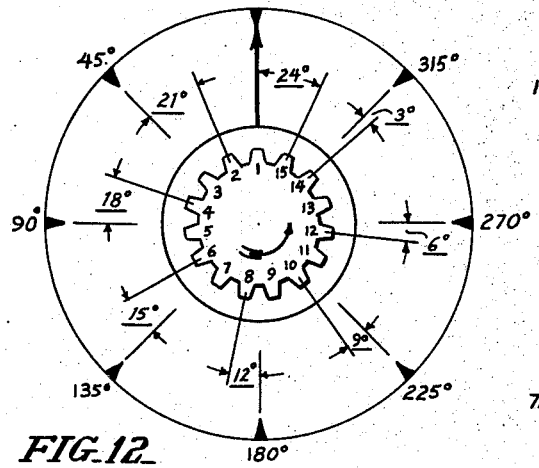

FIG. 12 shows a diagrammatic view of an alternative embodiment of the invention having fifteen teeth and eight switch contacts evenly spaced apart every 45 degrees. As in the other embodiments of the invention, only one tooth is in alignment with a switch contact. In the embodiment of FIG. 12, the time between closing of switch contacts may be varied by increments of three degrees of cam rotation. For example, to vary the time of closing of switch contacts of adjacent flights, advance the cam of one flight by thirteen teeth, and advance the electrical leads of said switch by seven switch positions from the zero degree position to the 315 degree position. By a similar procedure, time differentials corresponding to 6, 9, 12, 15, 18, 21, and 24 degrees may be obtained.

Figure 13:
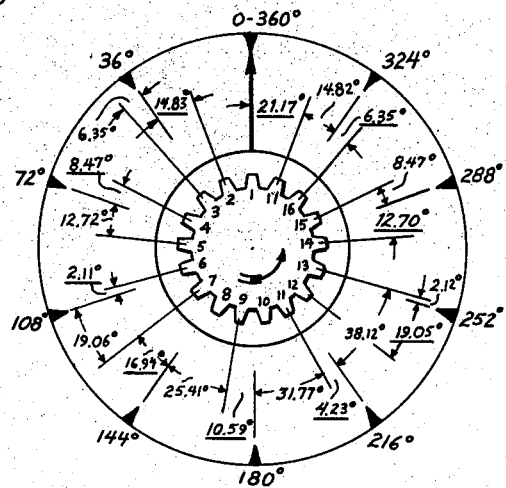

Another embodiment of the invention is disclosed in FIG. 13 wherein ten contacts are provided evenly spaced apart by 36 degrees and the splined shaft is provided with seventeen teeth evenly spaced apart by approximately 21.17 degrees. To obtain a 2.11 degree delay in a switch closing, the cam is moved five teeth and the electrical leads are transferred to the 108 degree contact position. To obtain a 4.23 degree delay, the cam is moved ten teeth and the electrical leads are transferred to the 216 degree switch contact station. It is to be noted that the delay increment increases by 2.11 degrees at every third switch position, i.e., 2.11 degrees at the 108 degree switch position, 4.23 degrees at the 216 degree switch position, 6.35 degrees at the 324 degree switch position, and so on.

To obtain a 6.35 degree of cam rotation advance in a switch closing, advance the cam of one flight by two teeth, and disconnect and advance the electrical leads of its associated switch by one switch position from zero degrees to 36 degrees.

It is to be noted in the embodiment of FIG. 13, that advancing the cam by ten teeth and the switch by five positions to 180 degrees gives an advance in switch closing of an increment of time corresponding to 31.77 degrees (which is a multiple of 6.35 degrees, approximately) of cam rotation. However, advancing the cam by twelve teeth gives an increment of either 38.12 degrees ahead of the 216 degree switch position, or an increment of 2.12 degrees ahead of the 252 degree switch position.

Advancing the cam by fourteen teeth gives an increment of 8.47 degrees between that position and the 288 degree switch contact position. This 8.47 degree increment is the sum of the 6.35 degree increment plus the 2.12 degree increment.

Similarly, advancing the cam by sixteen teeth gives an increment of 14.82 degrees relative to the 324 degree switch contact position. This 14.82 degrees is the sum of 6.35 degrees plus 6.35 degrees plus 2.12 degrees.

Time differentials obtainable from the embodiment of FIG. 13 include time corresponding to cam rotation of approximately 6.35, 12.72, 19.06, 25.41, 31.77, 38.12, 2.12, 8.47, 14.82, 21.17, 16.94, 10.59, and 4.23 degrees.

Figure 14:
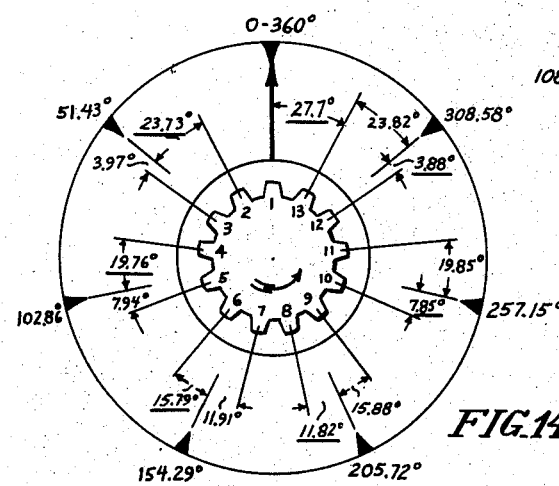

FIG. 14 discloses an embodiment of the invention wherein are provided thirteen teeth spaced evenly apart by about 27.7 degrees and seven switch contacts spaced evenly apart by approximately 51.43 degrees. Here the vernier delay increment corresponds to 3.88 degrees of cam rotation. For example, to obtain a 3.88 degree increment, advance the cam by eleven teeth and advance the leads to the switch by six switch positions to 308.53 degrees.

The vernier advance increment corresponds to 3.97 degrees of cam rotation. For example, to obtain a 3.97 degree advance increment, advance the cam by two teeth and advance the switch by one switch position to 51.43 degrees.

Time differentials obtainable from the embodiment of FIG. 14 include time corresponding to cam rotation of approximately 3.97, 7.94, 11.91, 15.88, 19.85, 23.82, 27.7, 23.73, 19.76, 15.79, 11.82, 7.85, and 3.88 degrees.

FIG. 15 discloses an embodiment of the invention wherein the sampling switch apparatus is provided with ten contacts evenly spaced 36 degrees apart, and with eleven teeth evenly spaced 33 degrees apart. The increment of time corresponds to 3.3 degrees of cam rotation. To illustrate, an increment corresponding to 3.3 degrees of cam rotation is obtained by advancing the cam by one tooth, and by advancing the switch by one cam position from zero degrees to 36 degrees. Time differentials obtainable from the embodiment of FIG. 15 include time corresponding to cam rotation of about 3.3, 6.6, 9.9, 13.2, 16.5, 19.8, 23.1, 26.4, 29.7 and 32.7 degrees.

FIG. 16 discloses another embodiment of the invention wherein the sampling switch apparatus is provided with ten contacts spaced evenly apart by 36 degrees, and nine teeth evenly spaced 40 degree apart. The time increment corresponds to four degrees of cam rotation. To illustrate, advance the cam by eight teeth, and advance the switch by nine stations from zero degrees to 324 degrees, and a delay time increment correseponding to four degrees of cam rotation is obtained. Time differentials obtainable from the embodiment of FIG. 16 include time corresponding to cam rotation of 4, 8, 12, 16, 20, 24, 28, 32, and 36 degrees.

To summarize, the figures disclose sampling switch apparatus comprising a splined shaft 25, a stack 32 of rotatable cams 27 mounted on shaft 25 and rotatable therewith, a corresponding stack 33 of switch-contact support rings positioned around said stack 32 of rotatable cams 27 and radially spaced therefrom, a number of switch contacts evenly spaced apart on said support rings, and vernier means for changing the time of closing of a switch of one flight with respect to the time of closing of a switch of another flight by small increments of time, said vernier means including a number of teeth formed on splined shaft 25 and meshing with corresponding teeth on said cams 27, said number of teeth being such that only one of the teeth is in alignment with a switch contact.

Also in summary, the method of changing the time of closing a switch of one flight with respect to the time of closing of a switch of another flight by desired increments of time comprises the steps of advancing the cam of one flight by a number of teeth, and advancing the switch of that flight by a number of switch positions. This advancing of the switch may be accomplised by disconnecting and advancing the electrical leads of the switch, or by advancing the support ring of the switch itself.

The cam followers 38 of the sampling switch apparatus of this invention are made of flat-leaf spring construction and are accurately dimensioned to insure that the making and breaking of the cam followers 38 are accurately timed and controlled. The cam followers 38 are fixedly secured against all unwanted movement, including sliding and twisting movements, through the action of the Z-shaped recesses 36 and inserts 37, and this fixed anchorage is obtained without the use of screws. The exact sequence of opening and closing the electrical circuits which are connected to cam followers 38 is accurately controlled and is easily adjusted through the provision of an odd number of teeth on splined shaft 25 and cams 27. The entire apparatus is made as a package unit, as shown in FIG. 1, which is quickly and easily replaceable.

It is to be understood that the form of the invention herein shown and described is to be taken as a preferred embodiment. Various changes may be made in the shape, size and arrangement of parts. Equivalent elements may be substituted for those described herein, parts may be reversed, and certain features of the invention may be utilized independently of the use of other features, all without departing from the spirit of the invention or the scope of the subjoined claims.

The claimed invention:

1. Sampling switch apparatus comprising a shaft, a rotatable cam having internal teeth with a predetermined tooth angle mounted on said shaft and rotatable therewith, a series of switch contacts, switch-contact support means positioned around said rotatable cam and radially spaced therefrom, and means for changing the alignment between the cam teeth and the switch contacts by increments of an angle smaller than the cam tooth angle, said means comprising said support means and said cam teeth.

2. Sampling switch apparatus comprising a shaft, a rotatable cam having internal teeth with a predetermined tooth angle mounted on said shaft and rotatable therewith, a switch-contact support means positioned around said rotatable cam and radially spaced therefrom, a number of switches forming a flight of switches mounted on said support means, said cam being provided with a lobe adapted to contact and close said switches during rotation of said cam, a prime number of teeth formed on said shaft, said teeth being evenly spaced apart and meshing with said teeth on said cam, said prime number being different from said number of switches, whereby the alignment between the cam teeth and the switches may be changed by increments of an angle smaller than the cam tooth angle.

3. Sampling switch apparatus comprising a shaft, a rotatable cam having internal teeth with a predetermined tooth angle mounted on said shaft and rotatable therewith, a series of switch contacts, switch-contact support means positioned around said rotatable cam and radially spaced therefrom, and means for changing the alignment between the cam teeth and the switch contacts by increments of an angle smaller than the cam tooth angle, said means comprising said support means and said cam teeth, said number of teeth being such that only one of the teeth and their placement is in alignment with a switch contact.

4. The sampling switch apparatus defined in claim 3, wherein said number of switch contacts is an even number, and said number of teeth is an odd number.

5. The sampling switch apparatus defined in claim 3, wherein said number of switch contacts is eight, and said number of teeth is fifteen.

6. The sampling switch apparatus defined in claim 3, wherein said number of switch contacts is ten, and said number of teeth is seventeen.

7. The sampling switch apparatus defined in claim 3, wherein said number of switch contacts is seven, and said number of teeth is thirteen.

8. The sampling switch apparatus defined in claim 3, wherein said number of switch contacts is ten, and said number of teeth is eleven.

9. The sampling switch apparatus defined in claim 3, wherein said number of switch contacts is ten, and said number of teeth is nine.

10. Sampling switch apparatus comprising a shaft, a stack of rotatable cams having internal teeth with a predetermined tooth angle mounted on said shaft and rotatable therewith, a corresponding stack of switch-contact support rings positioned around said stack of rotatable cams and radially spaced therefrom, six switches forming a flight of switches mounted on each ring and spaced 60 degrees apart along the circumference of the support rings, each cam being provided with a lobe adapted to contact and close said switches during rotation of said cam, thirteen teeth formed on said shaft, said teeth being evenly spaced apart and meshing with corresponding teeth on said cams, whereby the relative time of closing the switches of one flight may be varied by the time corresponding to approximately 4.6 degrees of cam rotation by advancing the cam of another flight by two teeth of the splined shaft and by advancing the cam of another flight by two teeth of the splined shaft and by advancing the support ring corresponding to said advanced cam by the angular distance between adjacent switches.

11. Sampling switch apparatus comprising a shaft, a stack of rotatable cams having internal teeth with a predetermined tooth angle mounted on said shaft and rotatable therewith, a corresponding stack of switch-contact support rings positioned around said stack of rotatable cams and radially spaced therefrom, a number of switches forming a flight of switches mounted on each ring, each switch being evenly spaced apart along the circumference thereof, each cam being provided with a lobe adapted to contact and close said switches during rotation of said cam, and a prime number of teeth formed on said shaft and evenly spaced apart and meshing with corresponding teeth on said cams, said prime number of teeth being different from the number of switches, whereby relative time of closing the switches of one flight with respect to the closing of the switches of another flight may be varied by an increment of time corresponding to less than the time required for said cams to rotate the number of degrees between cam teeth, by advancing the cam of the outer flight by a number of teeth of the splined shaft and by advancing the support ring corresponding to said advanced cam.

References Cited in the file of this patent

UNITED STATES PATENTS

| | | |
|---|---|---|
| 2,146,562 | Cameron et al. | Feb. 7, 1939 |
| 2,202,698 | Latta | May 28, 1940 |
| 2,219,372 | Poole | Oct. 29, 1940 |
| 2,262,306 | Thompson | Nov. 11, 1941 |
| 2,795,658 | Ward | June 11, 1957 |
| 2,796,474 | Glogan | June 18, 1957 |
| 2,847,525 | Everard | Aug. 12, 1958 |
| 2,938,970 | Constantine | May 31, 1960 |